United States Patent Office 3,845,095
Patented Oct. 29, 1974

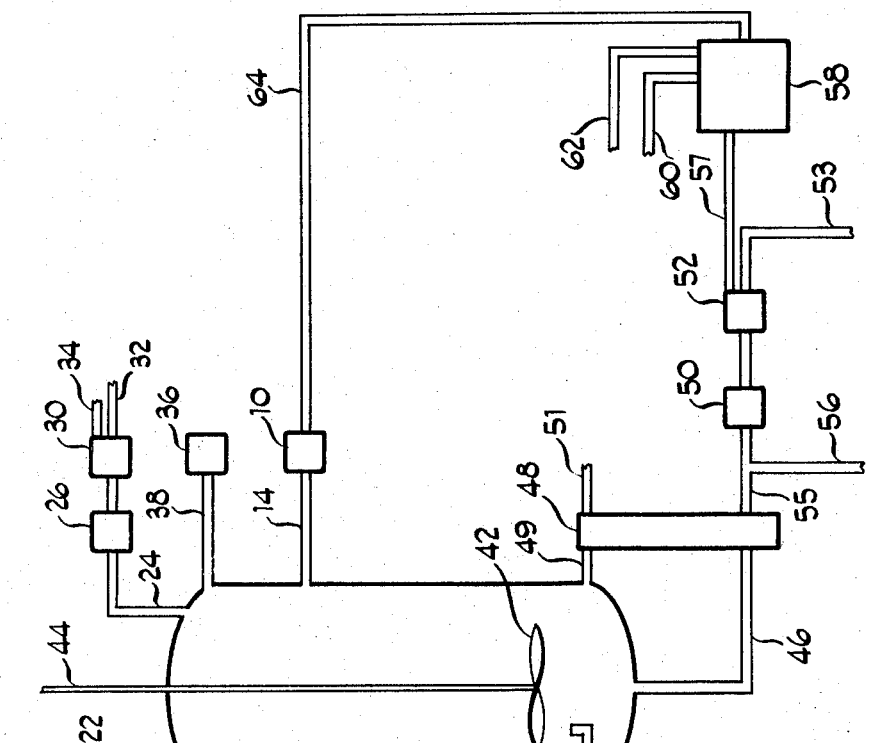
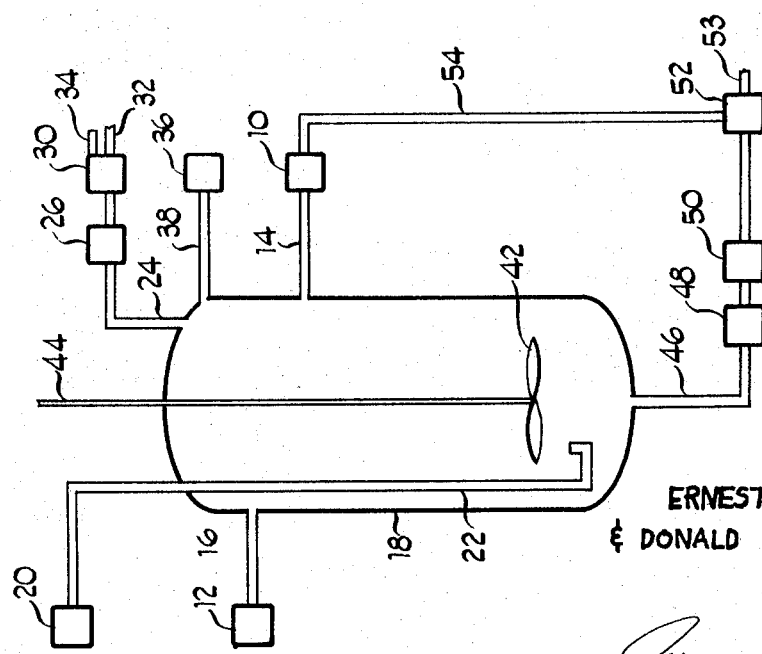

3,845,095
PROCESS OF DEHYDROHALOGENATION OF α,β - DIHALOGENATED PROPIONIC ACID COMPOUNDS
Ernest L. Bechstein and Donald C. Cronauer, Parkersburg, W. Va., assignors to Borg-Warner Corporation, Chicago, Ill.
Continuation of application Ser. No. 36,498, May 11, 1970, which is a continuation-in-part of application Ser. No. 655,117, Sept. 21, 1967, both now abandoned. This application Jan. 22, 1973, Ser. No. 325,717
Int. Cl. C07c 69/52, 121/30, 121/52
U.S. Cl. 260—465.7      6 Claims

ABSTRACT OF THE DISCLOSURE

An improved continuous or semi-continuous process for the dehydrohalogenation of alpha,beta-dihalogenated propionic acid compounds using alkali metal monohydrogen phosphate in aqueous solution wherein the alkali metal monohydrogen phosphate is regenerated in situ during the reaction through addition of alkali metal hydroxide and reused. At the end of the process, the alkali metal monohydrogen phosphate may be further recycled by precipitation and recovery from the waste stream.

CROSS REFERENCE TO RELATED APPLICATIONS

This is a Continuation of Application Ser. No. 36,498, filed May 11, 1970, now abandoned, which was a Continuation-in-Part of Application Ser. No. 655,117, filed Sept. 21, 1967, now abandoned.

BACKGROUND AND SUMMARY OF THE INVENTION

Prior to this invention, it was possible to produce α-haloacrylic acid and its esters and nitriles by heating an α,β-dihalopropionic acid, ester or nitrile with an aqueous solution of an alkali metal monohydrogen phosphate such as, for example, disodium hydrogen phosphate and recovering the dehydrohalogenated product. This process is described in U.S. Pat. No. 2,640,073 issued May 26, 1953. The monohydrogen phosphate salt was added to the dihalopropionic acid ester or nitrile in an amount corresponding to about 1–3 moles of alkali metal monohydrogen phosphate per mole equivalent of dihalopropionic acid compound. At temperatures of about 60–110° C., the reaction was substantially complete within about 1–5 hours. When the α-haloacrylic acid compound was volatile, it was recovered from an aqueous solution by distillation and subsequently purified by further distillation. When the α-haloacrylic acid compounds produced were non-volatile, they were recovered from the reaction mixture by extraction with a volatile organic solvent. In any case, the sodium hydrogen phosphate solution was ordinarily discarded because it was considered economically unfeasible to attempt regeneration to sodium monohydrogen phosphate for subsequent use.

SUMMARY OF THE INVENTION

This invention is an improvement in prior processes of dehydrohalogenation for α,β-halogenated acid compounds wherein the alkali metal monohydrogen phosphate salt used in the dehydrohalogenation reaction is regenerated in situ from by-product sodium dihydrogen phosphate. In accordance with the method of this invention, the phosphate salt may be used indefinitely.

Briefly described, this invention is a method of dehydrohalogenating α,β-dihalopropionic acid compounds of the formula

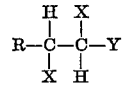
(1)

wherein R is a hydrocarbyl radical selected from the group consisting of hydrogen, $C_1$–$C_{10}$ alkyl and $C_6$–$C_{10}$ aryl, alkaryl and aralkyl groups; X is a halogen selected from the group consisting of bromine and chlorine; and Y is a radical selected from the group consisting of

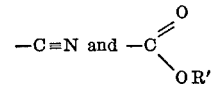

wherein R' is a radical selected from the group consisting of hydrogen, $C_1$–$C_{10}$ alkyl and $C_6$–$C_{10}$ aryl, alkaryl and aralkyl groups.

The products of this invention are α-haloacrylic acid compounds of the formula

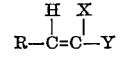
(11)

wherein R, X and Y are defined in Formula 1.

The process of this invention comprises the steps of feeding an α,β-dihalogenated propionic acid compound into a vessel containing an aqueous solution of an alkali metal monohydrogen phosphate. A reaction occurs to remove the β-halogen and the α-hydrogen from the α,β-halogenated compound to thereby form an α-halogenated compound. The alkali metal monohydrogen phosphate is generally one that is easy to work with such as disodium hydrogen phosphate.

As a result of the reaction, salts are formed and if the sodium salt is used, sodium dihydrogen phosphate and sodium chloride are formed. The alkali dihydrogen phosphate is regenerated to the alkali monohydrogen phosphate in situ by the continuous addition of an appropriate caustic solution, e.g., a concentrated aqueous solution of sodium hydroxide when disodium hydrogen phosphate is used. A concentrated caustic solution is preferred to minimize dilution of the reactor contents; however, any concentration above 5 percent appears adequate.

In the aqueous reactor product stream, the disodium hydrogen phosphate may be separated from the other salts in the solution by precipitation since disodium hydrogen phosphate is less soluble than sodium dihydrogen phosphate and sodium chloride at low temperatures. Solubility differences are shown in the following table:

| Salt | Solubility (g./100 g. water) | |
|---|---|---|
| | Cold water | Hot water |
| NaCl | 35.7 (0° C.) | 39.12 (100° C.) |
| Na₂HPO₄·12H₂O | 4.3 (0° C.) | 87.4 (34° C.) |
| NaH₂PO₄·H₂O | 59.9 (0° C.) | 427 (100° C.) |
| | 110.3 (20° C.) | |

The process of this invention may be utilized in a semi-continuous process wherein the dehydrohalogenation of α,β-dihalogenated compounds derived from propionic acid takes place with both the dihalogenated compounds and caustic solution being added continuously until the level of byproduct alkali chloride salt starts to precipitate. The reaction is then terminated and cooled to precipitate the alkali disodium hydrogen phosphate for recovery and recycle. Alternatively, a continuous process may be used wherein the dihalogenated compounds and the caustic solution are added continuously throughout the reaction after initiation. An aqueous stream is withdrawn from the reactor for cooling and recovery of the disodium hydrogen phosphate, which is recycled to the reactor.

The process of this invention will be more clearly understood from a reading of the following description of several embodiments of the process of this invention including semi-continuous and continuous processes which are set forth in connection with the accompanying drawings in which:

FIG. 1 is a flow diagram depicting the semi-continuous process; and

FIG. 2 is a flow diagram depicting the continuous process.

Referring more particularly to the drawings, FIG. 1 shows a flow diagram of that apparatus required to operate the invention using a semi-continuous process. In accordance with the process of this invention, an aqueous solution of disodium hydrogen phosphate from a suitable source 10 is charged via conduit 14 to a reactor 18. It is advantageous to charge an antioxidant, a polymerization inhibitor and an antifoam agent with the aqueous solution. Steam from a suitable source 20 is sparged by means of a probe 22 into reactor 18. When the liquid contents are at reaction temperature, $\alpha,\beta$-dichloropropionitrile via conduit 14 and concentrated aqueous sodium hydroxide via conduit 38 are continuously fed to reactor 18. Steam and $\alpha$-chloroacrylonitrile vapor mixture are evolved and removed from the reactor via conduit 24 and are condensed in a chiller 26. The condensate from chiller 26 passes to a separator 30 to split off $\alpha$-chloroacrylonitrile via conduit 30 and water via conduit 34.

The $\alpha,\beta$-dichloroacrylonitrile and concentrated caustic solution are continuously fed to the reactor as set forth above until the concentration of the sodium chloride in the reactor approaches the level at which it would precipitate in the chiller.

At that point, the reactor contents are drained via conduit 46 and tars are separated by settling in collector 48. The reactor contents (free of tars) are pumped through a chiller 50 and the resulting slurry is filtered at a filter member 52 yielding a brine which is discarded via conduit 53 and regenerated crystalline disodium hydrogen phosphate is conveyed to the disodium hydrogen phosphate source 10 via conduit 54.

FIG. 2 illustrates the flow of materials that takes place when carrying out the continuous process of this invention. After reaction initiation, the addition of the steam and the $\alpha,\beta$-dichloropropionitrile as well as the concentrated aqueous sodium hydroxide are fed from the same sources as those shown in FIG. 1.

As the $\alpha$-chloroacrylonitrile and steam are removed via conduit 24, the reactor 18 is drained via conduit 46. The reactor contents are separated at separator 48 and the organic phase, flowing from separator 48, is separated into two portions, one of which is redirected into the reactor via conduit 49 and the other of which is passed via conduit 51 to a sump and discarded, in order to prevent buildup of tars in the reactor.

The brine portion of the reactor contents are passed via conduit 55 to chiller 50. Sodium hydroxide may be added to this brine solution via conduit 56 prior to entering chiller 50. Disodium hydrogen phosphate is precipitated from the brine solution in chiller 50, which salt is separated by filtration 52 and the by-product solution (containing sodium chloride) is discarded via conduit 53. The regenerated disodium hydrogen phosphate is charged via conduit 57 to a dissolver 58. Hot water is also charged to dissolver 58 via conduit 60 along with fresh monohydrogen phosphate, which is charged via conduit 62. The brine resulting from dissolver 58 is in turn pumped via conduit 64 to the source of disodium hydrogen phosphate solution 10 for subsequent addition to reactor 18.

As an alternate to the aforementioned process, the sodium hydroxide may be added to the reactor via conduit 38 as set forth in FIG. 1, instead of being added via conduit 56 prior to the chiller 50 as set forth above.

Other $\alpha,\beta$-dihalopropionic acid compounds and other alkali metal salts may be used in the process of this invention. In each case, the solubility characteristics of the salts and by-product salts will have an effect on the synthesis procedure.

The examples set forth hereinbelow will be understood is view of the figures which have described the semi-continuous process with respect to FIG. 1 and the continuous process with respect to FIG. 2. All parts in the examples are by weight unless otherwise indicated.

EXAMPLE 1

Semi-Continuous Process 560 g. of water, 306 g. of anhydrous disodium hydrogen phosphate, 2.0 g. of tertiary-butylcatechol, 2.0 g. of ditertiary-butyl-para-cresol, 4.4 g. of silicone defoaming agent and 211.2 g. of $\alpha,\beta$-dichloropropionitrile were placed in the reactor which was heated to about 208° F. and sparged with steam. The reaction was continued for about fifteen minutes, at which time a 50 percent aqueous solution of sodium hydroxide was added at the rate of 106.6 ml. per hour. Dichloropropionitrile was also added at the rate of 196 ml. per hour. The sodium hydroxide and dichloropropionitrile were fed to the reaction for approximately two hours and 25 minutes. The reaction was completed and the total product collected was 488.5 g. of $\alpha$-chloroacrylonitrile which was 74.3 percent of the theoretical yield.

The ratio of moles of $\alpha$-chloroacrylonitrile product collected to moles of disodium hydrogen phosphate initially charged was 2.85, thereby confirming that in situ regeneration of sodium dihydrogen phosphate to disodium hydrogen phosphate by the sodium hydroxide had occurred.

EXAMPLE 2

Continuous Process 100 g. of water, 11.8 g. of disodium hydrogen phosphate, 0.2 g. of para-tertiary-butylcatechol, 0.2 g. ditertiary-butyl-para-cresol, 2 drops of a silicone defoamer comprising dimethyl siloxane oil emulsion containing silicates, and 26 g. of dibromobutanoic acid solution were placed in the reactor and heated to 208° F. with a heating mantle for one hour. The product was recovered by extracting the cracking solution with three 50 ml. chloroform washes. The three washes were combined and the chloroform distilled off yielding 7.4 g. of crude $\alpha$-bromocrotonic acid, which is 53.8 percent of theoretical yield. The phosphate solution remaining was regenerated by adding 3.4 g. of sodium hydroxide pellets dissolved in 4 ml. of water.

26 g. of dibromo-butanoic acid were added to the regenerated solution and heated again to 208° F. The product was recovered from the cracking solution as before with chloroform washes followed by distillation. The yield was 7.7 g. of crude product which is 56 percent of theoretical yield.

EXAMPLE 3

Semi-Continuous Process 560 g. of water, 505.6 g. of anhydrous disodium hydrogen phosphate, 2.0 g. of tertiary-butylcatechol, 2.0 g. of ditertiary-butyl-para-cresol, 4.4 g. of silicone antifoam agent, and 270 g. of methyl $\alpha,\beta$-dichloropropionate were charged to a reaction vessel. The reaction was heated to about 208° F. and sparged with steam. Product collection was started shortly after steam sparging was initiated. In fifteen minutes, the reaction was approximately half complete and the continuous introduction of sodium hydroxide (at a rate of 1 mole per hour) and methyl $\alpha,\beta$-dichloropropionate (at a rate of 1 mole per hour) was commenced. The continuous process was maintained for two hours at the end of which time the reaction was shut down, a total of 660 g. of methyl $\alpha,\beta$-dichloropropionate was charged and 393 g. of methyl $\alpha$-chloroacrylate (78 percent of theoretical) was produced.

It will be understood by those skilled in the art that the invention has been described with respect to certain specific embodiments thereof; however, the processes of this invention may be used in the preparation of compounds other than those described in the examples. The examples have been set forth for purpose of illustration and not by way of limitation.

What is claimed is:

1. In a process of dehydrohalogenating alpha,beta-dihalopropionic compounds of the formula

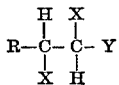

wherein R is a radical selected from the group consisting of hydrogen and methyl, X is a halogen selected from the group consisting of bromine and chlorine and Y is a radical selected from the group consisting of

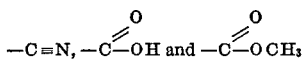

wherein an aqueous solution containing disodium hydrogen phosphate is charged to a reactor along with an alpha,beta-dihalopropionic compound as defined above, and wherein the reactor is heated at a temperature of about 60–110° C., and wherein an alpha-haloacrylic compound is produced and collected in the vapors coming from the reactor, and wherein byproduct sodium dihydrogen phosphate and sodium halide are formed; the improvement comprising adding sodium hydroxide to the reaction mixture at a rate sufficient to maintain a solution of disodium hydrogen phosphate by regeneration from said sodium dihydrogen phosphate; and adding alpha,beta-propionic acid compound to the reaction mixture; and discontinuing the addition of sodium hydroxide and alpha,beta-propionic acid compound at the point where said sodium halide begins to precipitate; whereby disodium hydrogen phosphate is continuously regenerated for dehydrohalogenating the alpha,beta-dihalopropionic compound added.

2. The improved process of Claim 1 wherein the reaction mixture remaining after discontinuing the addition of sodium hydroxide and alpha,beta-propionic acid compound is cooled to effect precipitation of the disodium hydrogen phosphate contained therein.

3. The improved process of Claim 1 wherein said sodium hydroxide and said alpha,beta-halogenated propionic acid compound are simultaneously added to the reaction mixture in substantially equimolar proportion.

4. The improved process of Claim 1 wherein said alpha,beta-dihalopropionic compound is alpha,beta-dichloropropionitrile and said alpha-haloacrylic compound produced is alpha-chloroacrylonitrile.

5. The improved process of Claim 1 wherein said alpha,beta-dihalopropionic compound is methyl alpha, beta-dichloropropionate and said alpha-haloacrylic compound produced is methyl alpha-chloroacrylate.

6. The improved process of Claim 1 wherein said alpha, beta-dihalopropionic compound is dibromobutanoic acid and said alpha-haloacrylic compound produced is alpha-bromocrotonic acid.

References Cited

UNITED STATES PATENTS

| 2,640,073 | 5/1953 | Ney Jr. | 260—486 |
| 2,754,322 | 7/1956 | Anspon | 260—486 |
| 1,961,127 | 6/1934 | Coleman | 23—107 |

FOREIGN PATENTS

| 723,547 | 2/1955 | Great Britain | 260—465.7 |

JOSEPH P. BRUST, Primary Examiner

U.S. Cl. X.R.

260—465 G, 476, 486 D, 515 A, 539 R